April 10, 1951 Y. S. TOULOUKIAN 2,548,081
FLASH EVAPORATOR
Filed Sept. 7, 1949 2 Sheets-Sheet 1

WITNESSES:
V. W. Novak
D. J. McCarty

INVENTOR
Yeram S. Touloukian
BY
A. B. Reavis
ATTORNEY

April 10, 1951 Y. S. TOULOUKIAN 2,548,081
FLASH EVAPORATOR
Filed Sept. 7, 1949 2 Sheets-Sheet 2

INVENTOR
Yeram S. Touloukian
BY *a. B. Reavis*
ATTORNEY

UNITED STATES PATENT OFFICE 2,548,081

FLASH EVAPORATOR

Yeram S. Touloukian, West Lafayette, Ind., assignor to Westinghouse Electric Corporation, East Pittsburgh, Pa., a corporation of Pennsylvania Application September 7, 1949, Serial No. 114,390

4 Claims. (Cl. 122—40)

The invention relates to a flash evaporator and it has for an object to provide apparatus of this character wherein, for given physical dimensions, a relatively large evaporation surface is exposed and which operates to minimize carry-over of water droplets with the withdrawal of vapor.

Ordinarily, with a flash evaporator, excess carry-over is avoided by making the shell sufficiently large to minimize vapor velocities, the vapor with the entrained droplets of water being supplied to a separator which operates to screen out the droplets to minimize the carry-over. In accordance with the present invention, the apparatus may be dimensionally considerably smaller for the reason that the structure does not call for reducing so far as possible droplets of water entrained by the vapor in the vaporizing space, this being made possible because of the provision of baffle structure having its lower edges sealed by water in the shell, dividing the interior of the latter into vaporizing and separation spaces, and constraining the vapor and entrained droplets of water to flow through a nozzle whose outlet end is arranged below the vapor off-take for the separation space so that media discharging at high velocity from the nozzle and flowing to the vapor off-take is constrained to undergo reversal of direction of flow in the separation space so that droplets of water separate centrifugally from the stream undergoing reversal and impinge on and join the water at the bottom of the shell.

The foregoing and other objects are effected by my invention as will be apparent from the following description and claims taken in connection with the accompanying drawings, forming a part of this application, in which:

Figure 1:
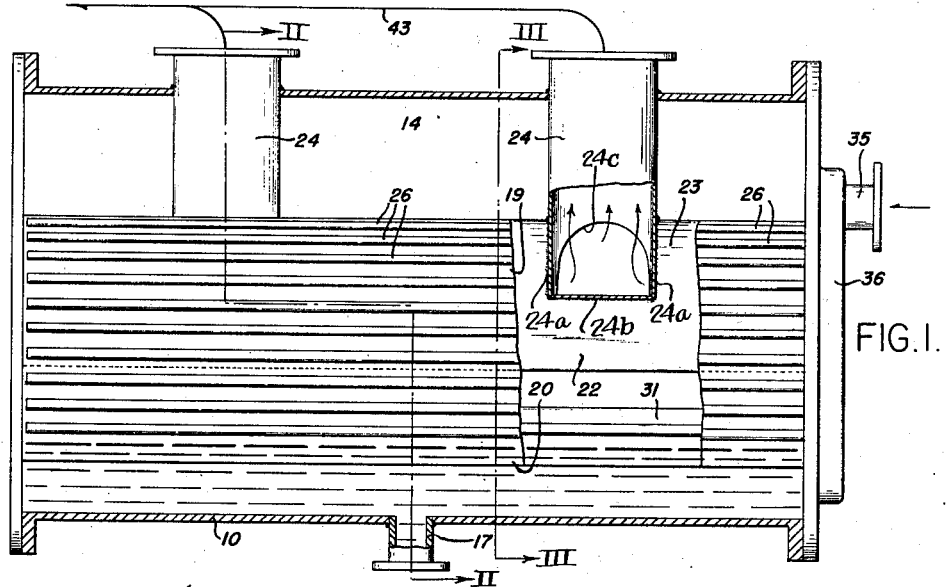
Fig. 1 is a sectional view of an evaporator incorporating the present invention.

Referring to the drawings, the evaporator includes a cylindrical shell 10 having baffle structure, at 11, therein and effective to separate the interior of the shell into vaporizing and separating spaces 14 and 15, respectively.

The shell is provided with a water outlet 17 at the bottom thereof and arranged to maintain a desired normal water level in the shell.

The baffle structure is comprised by a pair of curved plates 19, 19 having their lower edge portions 20, 20 submerged in the water at the bottom of the shell so that the evaporating and separating spaces are separated by a water seal. The plates are curved upwardly to provide, with respect to the shell, upwardly diverging involute portions 21, 21 of the evaporating space, and the plates have downwardly curved portions 22, 22 cooperating to define a nozzle passage 23 extending from end to end of the shell and through which media flows from the evaporation space to the separation space.

The upper portion of the separation space has vapor off-takes 24 connected to any suitable suction means, such as a condenser.

Each off-take 24 is comprised by tubular wall elements 24a, 24a extending across the nozzle space between the curved nozzle walls 22, 22 and joined to the latter and to a bottom plate 24b, which is also joined to the nozzle walls, to provide off-take inlets 24c, 24c opening into the separating space 15.

Water at a temperature higher than that corresponding to the pressure in the shell is supplied through spray pipes 26 distributed along the baffle plates 19, 19 and arranged to provide a relatively large evaporation surface, the spray pipes having spray openings arranged to discharge generally downward, as indicated, so that vapor released from the sprays is constrained to undergo reversal of direction in flowing through the involute spaces to the inlet of the nozzle, whereby entrainment of water droplets with the vapor is minimized, the water flowing to the bottom of the shell. The divergency of the involute spaces provides for preservation of substantially uniform velocity therein because of the successive additions of vapor to the streams flowing toward the nozzle inlet.

The nozzle 23 extends downwardly into the separation space so that its discharge end is well below the vapor off-take inlets, in consequence of which media discharging from the nozzle and entering the off-takes is constrained to undergo reversal; and, as the nozzle operates to accelerate the media to a suitably high velocity with very little heat or pressure drop, such velocity provides for the water droplets having kinetic energy resisting reversal of flow with the result that the droplets separate centrifugally to a very large extent and impinge on and join the body of water at the bottom of the separation space.

To avoid direct and downward impingement of the nozzle discharge with the water at the bottom of the shell, there is provided, below the discharge end of the nozzle, a vapor deflector and drip drainer, at 30, extending from end to end of the shell. As shown, the deflector and drip drainer is of inverted V-form and the sides thereof preferably have drainage openings so that water collecting on the higher portions of the deflector may drain off, leaving the remaining and lower portions thereof relatively free of water, whereby the deflector performs a separating function, that is, it aids in turning the vapor component for flow to the vapor off-takes while, at the same time, providing for water droplets collecting thereon being drained off to the bottom of the shell. More particularly, as shown, the deflector and drip drainer is preferably comprised by an inverted V-shaped member 31 having concave sides together with concave plates 32 having their upper edges overlapping the lower edges of the inverted V-shaped members to provide slots 33 through which water collecting on the member 31 may drain off, thereby leaving the plates 32 relatively free of water in performing their function of deflecting vapor.

In operation, it will be apparent that, with water suitably withdrawn from the shell, with the vapor off-take for the separation space connected to a suitable suction or low-absolute-pressure-maintaining means, and with water supplied to the spray pipes at a temperature higher than that corresponding to the pressure maintained in the vaporizing space, a portion of the spray will be vaporized. As the spray pipes are sufficient in number and are distributed along the outer surface of the baffle plates, for a given size of shell, there is provided a relatively large vapor disengaging surface. Furthermore, as the spray openings of the spray pipes are all directed so as to discharge generally downward, vapor released from the sprays is constrained to undergo reversal in flowing through the involute spaces to the inlet of the nozzle, this reversal minimizing entrainment of water with vapor entering the nozzle inlet, the water continuing to travel generally downward and joining the water at the bottom of the shell.

The nozzle extends downwardly into the separation space so that its discharge end is spaced well below the vapor off-take so that the vapor entering the nozzle and accelerated therein to a suitable high velocity is constrained to undergo reversal before entering the vapor off-take, a smooth reversal of flow with a minimum of turbulence being promoted by the vapor deflector, at 30, arranged below the discharge end of the nozzle, the deflector being preferably constructed and arranged to provide for separation of water from the media flowing therealong. In this connection, the greater density of water droplets flowing with the vapor in the evaporation chamber and toward the inlet of the nozzle would tend to cause such droplets to flow with greater concentration in the core of the stream passing through the nozzle. The deflector, therefore, serves to provide for flow of any such droplet concentration to the water at the shell bottom while providing for deflection of the vapor component for flow toward the vapor off-take means. Due to velocity acquired in traversing the nozzle, the kinetic energy of entrained water droplets tends to cause them to continue to travel downwardly and impinge and join the pool of water at the bottom of the separation space, the cohesion of the droplets with the water resisting any separation thereof. Thus, due to centrifugal action entrained water droplets are effectively separated and vapor entering the vapor off-take has a suitably small carry-over.

Figure 2:
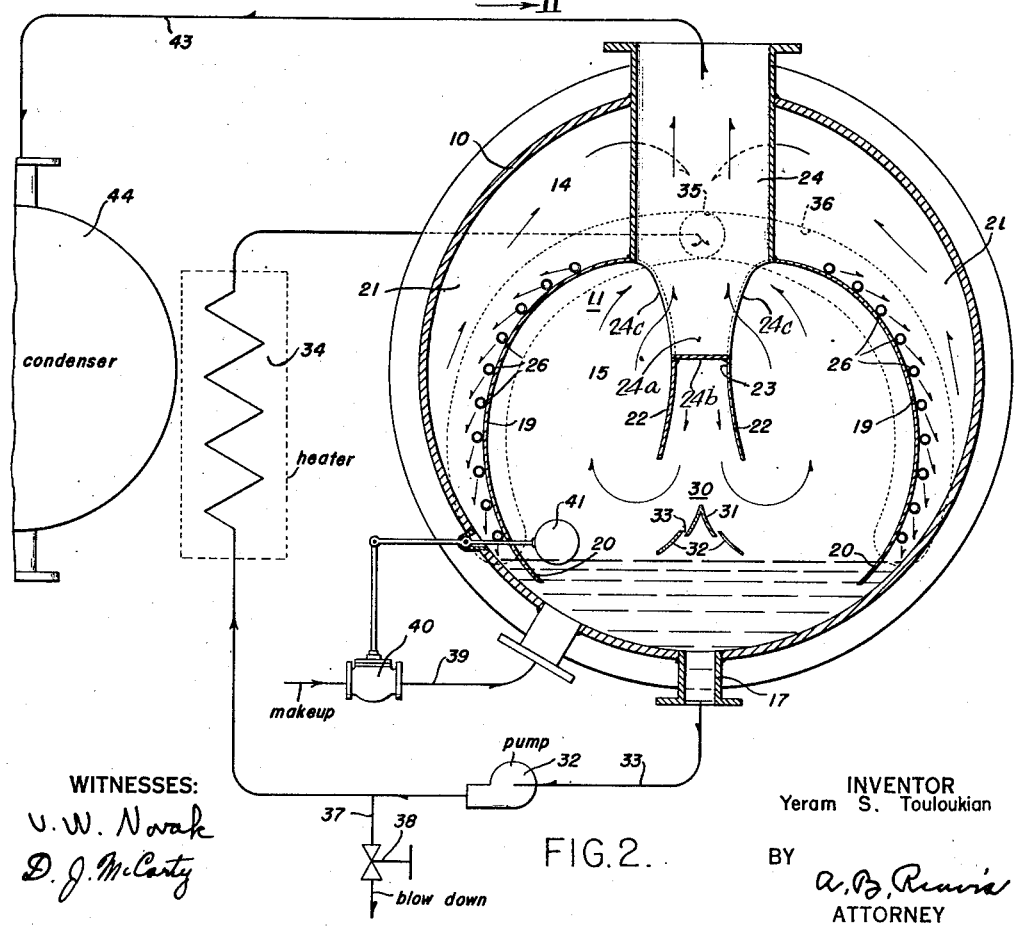
Fig. 2 is a sectional view taken along the line II—II of Fig. 1 with associated system features.
Figure 3:
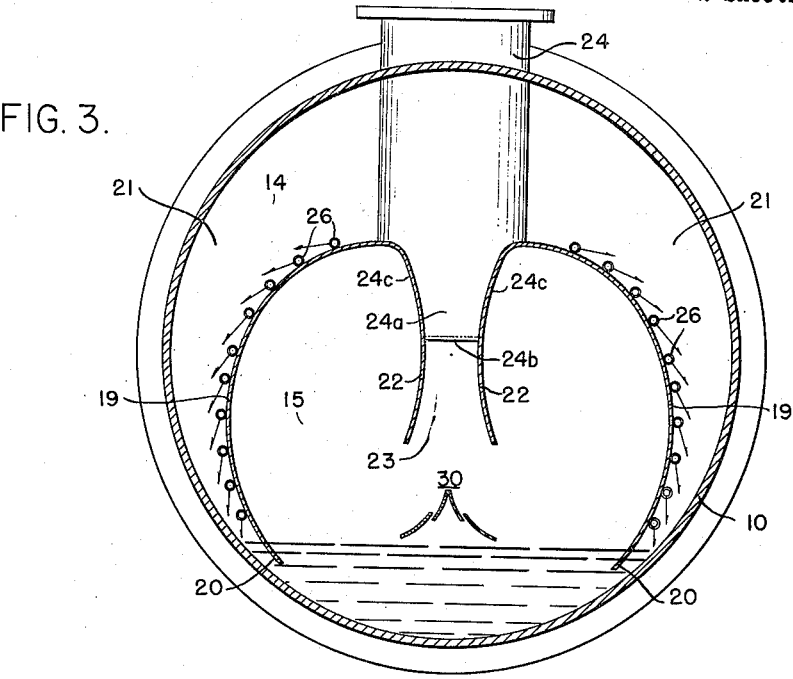
Fig. 3 is a sectional view taken along the line III—IIII of Fig. 1.
Figure 4:
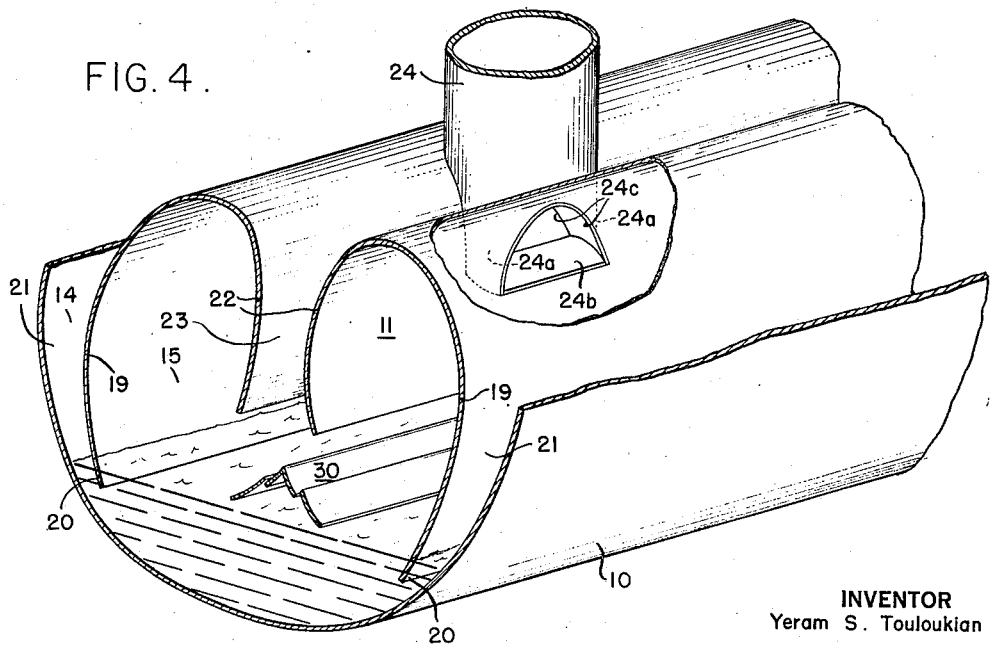
Fig. 4 is a fragmentary, perspective view of the evaporator.

Water may be supplied to and withdrawn from the evaporator in any suitable manner so long as the temperature of the water is above that corresponding to the pressure maintained in the evaporator. Also, it is to be understood that vapor may be withdrawn from the evaporator in any suitable manner. By way of example, in Fig. 2, the pump 32 withdraws water from the outlet 17 through the conduit 33 and passes it through the heater 34, from which it is discharged to the inlet 35 of a box or manifold 36 with which the spray pipes 26 are in open communication. If such an arrangement for recirculation is used, provision should be made for periodic blow-down to avoid undue concentration. Accordingly, there is shown a blow-down connection 37 provided with a valve 38 and a make-up connection 39 having a valve 40 which is opened by the float 41 when the level at the bottom of the shell declines a predetermined amount. Upon opening of the valve 38, water withdrawn from the shell by the pump 32 is discharged through the blow-down connection 37 and, as the water level declines, the float operates to open the valve 40 and supplies make-up to the interior of the shell. Also, as shown in Fig. 2, suitably low absolute or suction pressure is provided for the separation space, at 15, by means of the conduit 43 for supplying vapor from the vapor off-takes 24 to the surface condenser 44 which operates to provide a relatively low absolute pressure with condensation of the vapor.

While I have shown the invention in but one form, it will be obvious to those skilled in the art that it is not so limited, but is susceptible of various changes and modifications without departing from the spirit thereof.

What I claim is:

1. In a flash evaporator, a shell normally having water in the lower portion thereof, baffle structure having its lower edges submerged in the water in the shell so as to divide the interior of the latter into vaporizing and separating spaces, vapor off-take means communicating with the upper portion of the separation space, means for spraying water into the evaporation space, a nozzle provided by said baffle structure, said nozzle having its inlet communicating with the evaporation space and extending downwardly so that its discharge end is below the inlet of the vapor off-take means, whereby media accelerated by and discharging from the nozzle and flowing to the inlet of the vapor off-take means is constrained to undergo reversal of direction of flow in the separation space so that droplets of water may separate and impinge on and join the body of water at the bottom of the separation space.

2. Apparatus as claimed in claim 1 wherein the spray means is comprised by spray pipes distributed along the outer surfaces of the baffle structure and the latter cooperates with the shell to provide an evaporation space which diverges from the lower edge portions of the baffle structure to the inlet of the nozzle in order that a substantially uniform velocity of vapor flowing to the inlet of the nozzle may be maintained.

3. Apparatus as claimed in claim 1 with a deflector, within the separation space, and below the discharge end of the nozzle to aid in turning the vapor component from the nozzle discharge for flow to the off-take means.

4. Apparatus as claimed in claim 1 with a deflector of inverted V-form, within the separation space, and below the discharge end of the nozzle to aid in turning the vapor component of the nozzle discharge for flow to the off-take means, the sides of said deflector having drainage openings to provide for drainage of water therefrom.

YERAM S. TOULOUKIAN.

REFERENCES CITED

The following references are of record in the file of this patent:

UNITED STATES PATENTS

| Number | Name | Date |
| --- | --- | --- |
| 894,407 | Suzuki | July 28, 1908 |
| 2,299,110 | Richards | Oct. 20, 1942 |